Sept. 19, 1967   J. W. WEISNER ETAL   3,342,322
SAUSAGE CASING CARTON

Filed Nov. 9, 1965   3 Sheets-Sheet 1

INVENTORS.
JOHN W. WEISNER
CHARLES R. JUHASZ
BY
ATTORNEY

Sept. 19, 1967  J. W. WEISNER ETAL  3,342,322
SAUSAGE CASING CARTON

Filed Nov. 9, 1965  3 Sheets-Sheet 2

INVENTORS.
JOHN W. WEISNER
CHARLES R. JUHASZ
BY
ATTORNEY

INVENTORS.
JOHN W. WEISNER
CHARLES R. JUHASZ
BY
ATTORNEY

United States Patent Office 3,342,322
Patented Sept. 19, 1967

3,342,322
SAUSAGE CASING CARTON
John W. Weisner and Charles R. Juhasz, Chicago, Ill., assignors to Union Carbide Corporation, a corporation of New York
Filed Nov. 9, 1965, Ser. No. 506,939
4 Claims. (Cl. 206—46)

ABSTRACT OF THE DISCLOSURE

A two-part casing caddy is provided with apertures so that casings can be humidified after being packaged in the caddy.

---

The invention relates to a carton having particular utility for packaging shirred and compressed lengths of cellulosic sausage casings. More particularly, the invention relates to a carton of the type referred to in the sausage trade as a caddy, and hence such designation is employed hereinafter.

Unique problems are associated with the packaging of shirred and compressed sausage casings, these problems arising both from the physical nature of such casings and from the requirements for their use in a humidified condition.

Cellulosic sausage casings are conventionally made in continuous lengths and are thereafter shirred and compressed by various means well known to the art, into relatively rigid compressed tubular sticks of a length substantially corresponding to the length of the stuffing horn through which the meat emulsion is fed into the casing. Typically, a 40 foot or longer length of cellulosic casing is shirred and compressed to yield a rigid tubular stick of about 6 to 10 inches in length.

It is essential that the casing sticks be readily removable from the caddy without breaking or disjoining the shirred and compressed tubular stick of casing. A break in a casing stick deshirrs a portion of the casing, which may cause a discontinuity in the internal bore. Such discontinuity usually results in jamming on the filling tube of automatic meat stuffing equipment, or may cause extra handling in the manual stuffing operation. Where automatic meat emulsion stuffing devices are employed, it is desirable to transfer the entire caddy contents as a unit, from the caddy to the hopper of the automatic device.

It is usually preferred to maintain the moisture content of the cellulose casing at a low level for the shirring operation and at a higher level for the stuffing operation. Consequently, it has been the practice to package the shirred casing in a caddy having ventilating openings in its vertical end panels, some of said openings registering with the bores of the shirred casings and other openings with the space intermediate the outer surfaces of each group of four casings whereby external humid air can readily enter the package and humidify the casings to the desired extent. The shirred casings, upon being suitably humidified are kept in this condition until used by wrapping the caddy with a wax treated paper or other suitable moisture-barrier wrapping material. Ventilated caddies conventionally used by the trade for packaging shirred casings are illustrated and described in U.S. Patent 2,181,329 to Alfred G. Hewitt and 3,028,952 to James V. Milio. Such caddies have been made of paper box board material of three ply laminated construction with an inside heavy treatment of hot paraffin. Such material has been necessary to prevent the caddy walls adsorbing moisture from the humidified casings during storage.

In accordance with the present invention, a two part casing caddy is provided in combination with a moisture barrier liner for the casing sticks. The caddy has the requisite structural strength to function as a storage or shipping container and yet is sufficiently flexible or pliable to facilitate the simultaneous removal by the liner, of all of the casing sticks from the caddy without damage to the sticks. The two part sausage casing caddy includes a bottom member and a top member. The bottom member has a rectangular bottom panel, two side walls and two perforated end walls. The side walls have a first section which is integral with the two sides of said bottom panel and which is infolded 90° therefrom, a second section integral with said first section and infolded 180° therefrom, and an elongated slot along the fold between said first and second section. The perforated end walls are integral with the two end edges of said bottom panel, are infolded 90° therefrom and have end flaps integral with two opposing edges of said end walls. The end flaps are infolded 90° from said end walls and positioned between the said first and second sections of said side walls. The top member includes a rectangular top panel, two end flaps integral with the end edges of the top panel and infolded 90° therefrom and side tabs integral with the side edges of said top panel and infolded 90° therefrom. The top member is seated on the top edges of the bottom member with the end flaps laying over the end walls and covering the perforation wall. Each of the side tabs is positioned in a corresponding slot in the side walls.

The objects and advantages of the invention will be appreciated and the invention will be better understood from the following specification wherein the invention is described by reference to the embodiment illustrated by the accompanying drawings wherein.

Figure 1:
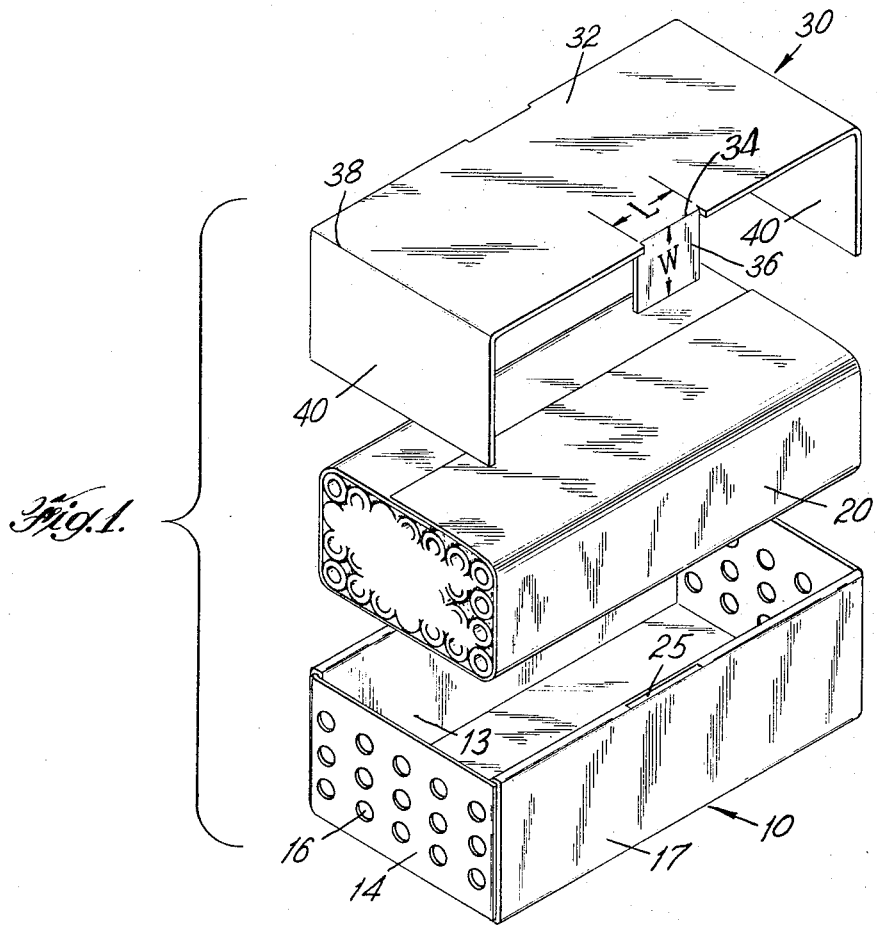
FIGURE 1 is an exploded perspective view of a casing caddy, showing a top member, a bottom member and a liner with enclosed casings.

As shown in FIGURE 1, the casing caddy is a two part carton, including a bottom section 10, a liner 20, and an upper section 30.

Figure 2:
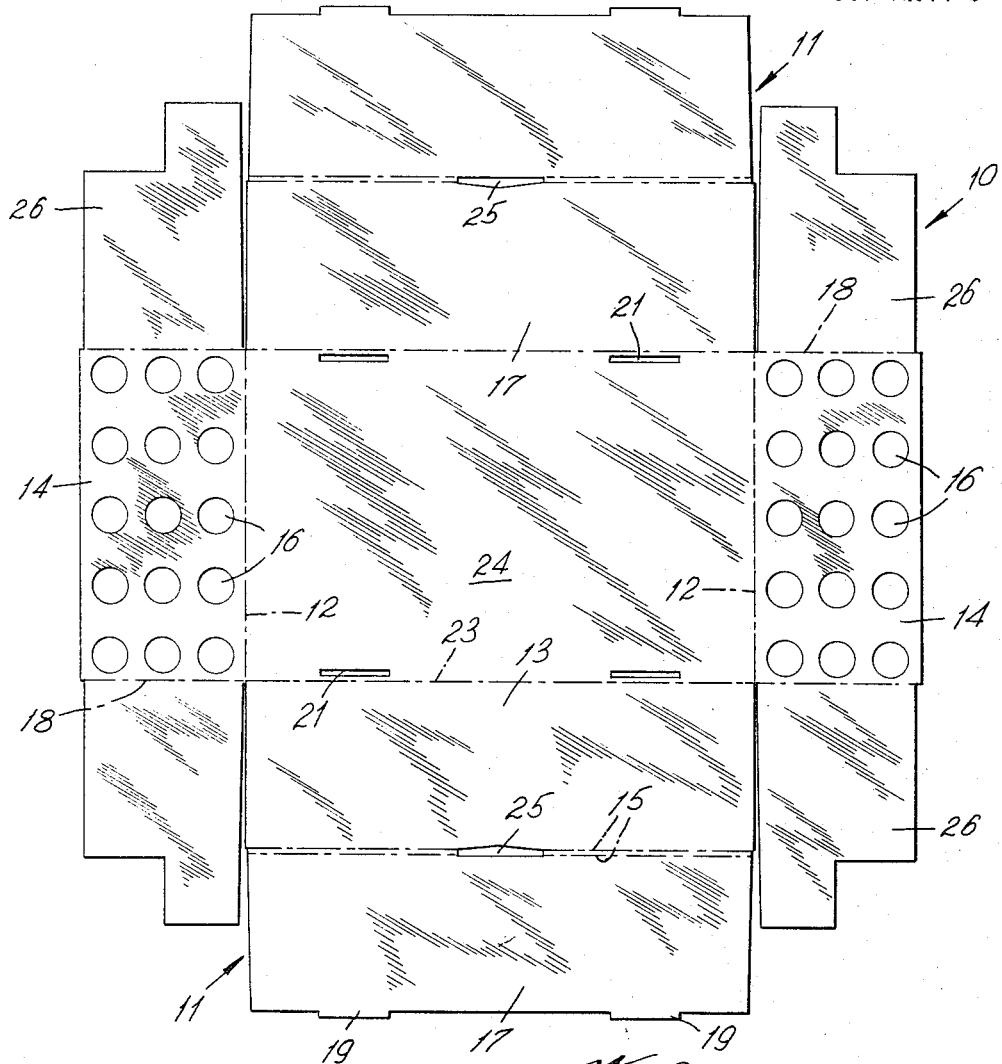
FIGURE 2 is a plan view of a blank for forming the bottom member.

As shown in FIGURE 2, the bottom section is formed from a blank which includes a rectangular bottom panel 24, a pair of dependent end panels 14, and a pair of dependent side panels 11. The blank is die cut from a sheet and fold lines are simultaneously formed by a scoring rule which makes an impression (or crushes flutes in the case of corrugated paper board) without cutting.

Each of the end panels has a plurality of apertures 16, and has a pair of flaps 26 dependent from opposing ends.

Figure 3:
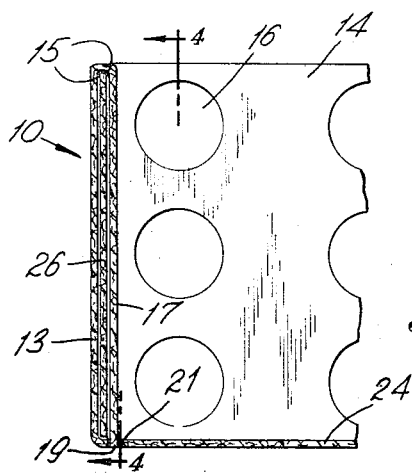
FIGURE 3 is a fragmentary, sectional view taken along section line 3—3 of FIGURE 4, showing the bottom member in assembled form.

The side panels are divided by a pair of fold lines 15 into a section 13 which will form the outer side wall and a section 17 which will form the inner side wall. The fold lines 15 run parallel with the fold lines 23 and are spaced apart a sufficient distance so as to provide a clearance between the outer wall 13 and the inner wall 17, for the end flap 26 when the bottom blank is assembled into the box configuration, as shown in FIGURE 3. The clearance can be slightly greater than the thickness of the corrugated paper so as to facilitate the assembling operation. For example, the pair of fold lines are spaced apart about one quarter of an inch for a paper such as B-flute, 150 pound burst strength, corrugated paper which is about 7/64 of an inch in thickness.

The side panels have an elongated slot 25, which extends along the fold lines 15 and has a width which increases with increasing distance of the ends of the slot. Advantageously, at least one edge of the slot 25 is U or V shaped.

Tabs 19 project from the section 17 and are dimensioned and aligned so as to mate with slots 21 in the bottom panel 24. The slots 21 are preferably spaced from the fold line 23 a distance about equal to the distance between the fold line 15 so as to maintain section 17 uniformly spaced from section 13.

The bottom blank is formed into a box structure by folding the end panels 14 inwardly 90° along the fold lines 12. The end panel flaps 26 are folded inwardly 90° along the fold lines 18.

The outer walls, sections 13 of the side panels 11 are folded inwardly 90°, along fold line 23 and then the inner side wall, section 17 is folded 180° along fold lines 15. The end panel flaps 26 are thus positioned between the inner side wall 17 and the outer side wall 13. The tabs 19 are inserted into their corresponding slots 21 in order to lock the structure in the assembled form.

The upper section 30 is formed from a die cut blank and includes a top panel 32, two end flaps 40, and side flaps 36 adapted to fit the slots 25 of the lower section. The upper section is assembled by infolding the end flaps 40 along fold lines 38, and the side flaps 36 along fold lines 34, 90° with respect to the top panel 32.

The assembling of the box structure involves inserting the side flaps 36 of the upper section 30, into their corresponding slots 25, in the bottom section 10.

The casing caddy advantageously also includes a sheet linear 20 of a moisture barrier material, such as polyethylene, polypropylene or the like.

The liner serves as a barrier to the adsorption of the moisture and humectant in the casing by the material from which the caddy is made. Heretofore, a costly, paraffin treated three ply laminated paper box board was used for the caddy to prevent such moisture adsorption from the humidified casings. The caddy of this invention is typically corrugated paper board. The liner lies between the casings and only the top, bottom and side walls of the caddy, thus leaving the casing ends exposed and permitting air flow through the apertures 16, in the end panels 14 and the casings.

The liner can advantageously, also be used as a sling to manually transfer the entire caddy contents from the caddy to the hopper of an automatic meat emulsion stuffing device.

The sheet liner is a rectangular member having a width slightly less than the distance between fold lines 12, in order to provide a clearance between the liner and the inside of the box, so as to permit the liner and the enclosed casings to be simultaneously removed without interference between the liner 20 and the end panels 14. A clearance of about ¼ to ½ inch has been found to give the desired results. The liner 20 has a length preferably at least equal to twice the distance between the fold lines 23, plus twice the depth of the box, in order to completely enclose the casings within the box.

Figure 5:
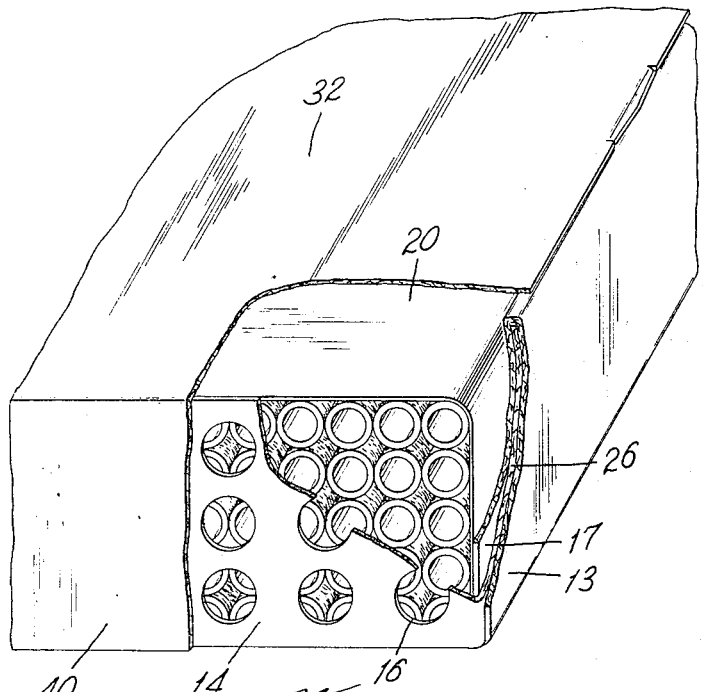
FIGURE 5 is a fragmentary, perspective view, partly in section, of the casing caddy in assembled form.

As shown in FIGURE 5, the apertures or holes 16 are dimensioned and positioned so that each hole registers with the openings through at least two casings and the longitudinally extending open space between several casings. The upper and lower row of holes 16, in the modification of FIGURE 5, register with the openings through four adjacent casings and the open space between the four casings, and the middle row of holes 16, register with the openings between two adjacent casings and two open spaces alongside the two casings.

The pattern of three rows of apertures or holes 16 with five apertures in each row, and aperture diameters from about 1 inch to 1¼ inches provide the desired results for a 50 casing carton of typical sized casings such as code 25 casings, but, obviously one skilled in the art can vary the size, pattern or number of apertures as required.

The end flaps 40, are provided to cover the apertures 16 in the end panels 14 and serve to reinforce the end panels when the caddy is filled. After shirring, the casing sticks are packed into the liner inside the caddy and are then humidified to a moisture content of up to about 20 percent. During this step in the process, the flaps 40 are folded back, advantageously 270° so as to expose the ventilation apertures 16 to the passage of moist air which is led through the bores of the casings, as well as around and about their exteriors. The flaps 40 can be held in their folded back positions by stacking the casing caddies in alternately upright and inverted positions in the humidifier apparatus. While the casings are being humidified, the end walls 14 are restrained from bulging by pneumatically powered grid means.

When the casing sticks have been conditioned to the predetermined moisture content, the caddies are removed from the conditioning apparatus and the end flaps 40 are folded 270° about the end panels 14 to cover the apertures 16, and then held in place, as for example, by taping with a pressure sensitive tape.

Several of the novel features of the invention will be better understood from a description of the effect on the casing caddy by the internal pressures exerted on the caddy walls by the forces of the highly compressed casing sticks and humidification after shirring.

It should first be noted that the compressed shirred casing sticks, during storage in the caddy, tend to expand longitudinally from their original shirred and compressed lengths, and this tendency is accentuated particularly, upon humidification of the casings. The longitudinal forces of casing expansion apply pressure to the end panels 14 and tend to cause the end panels to flex outwardly.

This outward flexure of the end panels 14 is resisted by the end flaps 40 which are secured in place as for example, by means of pressure sensitive tape.

Figure 4:
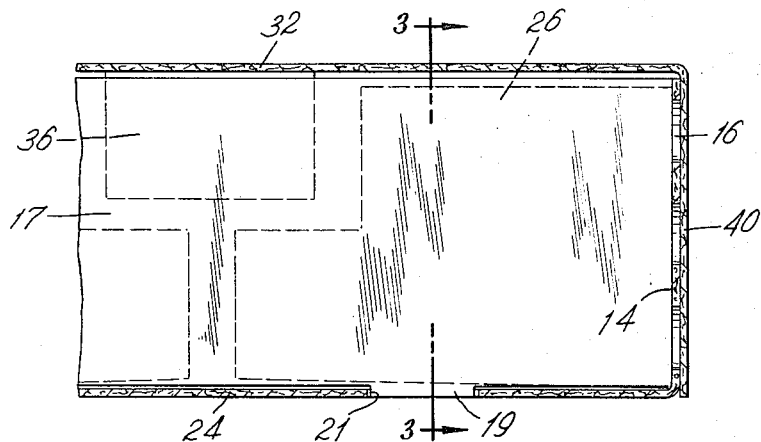
FIGURE 4 is a fragmentary, sectional view of the bottom member of FIGURE 3, taken along section line 4—4.

When the end flaps 40 are removed from the position in which they reinforce the end panels, the forces tending to expand the casing sticks flex the end panels outwardly. It is noted that the side wall is stiffest in the area where the end sections between the fold lines 15 act as a rigid structure and is relatively weaker in the area of the slot 25. Each side flap 36 of upper section 30 is inserted into slot 25 of bottom section 10 as seen in FIGURE 4 reinforces the double walled side member 11, but when the top section is removed, the side wall may be readily flexed outwardly.

The side flaps 36 must be sufficiently large to provide the structural strength required. If the flaps are too small, either in length or width (designated as L and W in FIGURE 1), they will make an insignificant contribution to the strength of the side panels and their removal from the slots 25 will not produce the required change in the composite structure from high to low structural strength. The exact dimensions to be employed depend upon factors such as the structural strength (primarily strength in flexure) of the material of the top member and the side panels. For example, in a casing caddy 19 inches long, the use of flaps 36, having lengths, L, of 9.5 inches and widths, W, of 2.75 inches give the desired result with B-flute, 150 lb. corrugated paper. The slots 25, are advantageously only about 1/16 of an inch longer than the flaps 36, so as to provide a fairly tight fit.

The side walls 11 of bottom section 10, after the removal of the upper section 30, are thus in a weakened condition and permit bending outwardly so that the casing may be removed therefrom with a minimum of interference.

What is claimed is:
1. A two part sausage casing caddy comprising: a bottom member, having
   a rectangular bottom panel, two side walls, said side walls having
- a first section integral with the two side edges of said bottom panel and infolded 90° therefrom,
- and a second section integral with said first section and infolded 180° therefrom, and
- an elongated slot along the fold between said first and second sections, and two apertured end walls integral with the two end edges of said bottom panel and infolded 90° therefrom, said end walls having
- end flaps integral with two opposing edges of said end walls, said end flaps being infolded 90° from said end walls and positioned between said first and second sections of said side walls, and a top member, having a rectangular top panel, two end flaps integral with the end edges of said top panel and infolded 90° therefrom, and side tabs integral with the side edges of said top panel and infolded 90° therefrom, said top member seating on said top edges of said bottom member, said end flaps lying over said end walls and covering said apertures, and each of said side tabs being positioned in a corresponding slot.

2. In the casing caddy of claim 1, an unsealed liner of moisture barrier polymeric material, said liner being positioned within said casing caddy between the side walls, the bottom panel, the top panel and casings contained in said caddy in order to protect said caddy from moisture adsorption from casings packed therein, said liner having a width less than the length of said bottom panel and a length at least equal to twice the width plus twice the depth of said caddy such that said casings can be readily removed from said caddy by means of said liner.

3. The casing caddy of claim 1, wherein said elongated slot and side tabs have a length equal to at least about 1/16 the length of said side walls.

4. A pair of paperboard blanks adapted to be formed into a two piece casing caddy comprising a first blank having:

(a) a rectangular bottom panel defined by a quartet of concomitant fold lines,
(b) a pair of apertured end panels hingedly connected along opposing fold lines to said bottom panel,
(c) a pair of end flaps hingedly connected along a second pair of opposing fold lines to each of said pair of end panels,
(d) a pair of side panels hingedly connected along a pair of opposing fold lines to said bottom panel, each of said side panels having a pair of parallel fold lines spaced substantially midway between the outer peripheral edge of said side panel and the fold line between said bottom panel and said side panel and being parallel to said fold line, and an elongated slot running along said pair of score lines; and a second blank having,
(a) a rectangular top panel
(b) a pair of end flaps hingedly connected along a pair of opposing fold lines to said top panel,
(c) a pair of side flaps hingedly connected along a second pair of opposing fold lines to said top panel, said side flaps being adapted for mating with said elongated slots in said first blank and said end flaps lying over said end walls such that they cover said apertures when said blanks are in erected condition.

References Cited

UNITED STATES PATENTS

| | | | |
|---|---|---|---|
| 2,195,070 | 3/1940 | Backert | 229—34 |
| 2,588,232 | 3/1952 | Grant | 229—43 |
| 3,063,767 | 11/1962 | Hever | 206—65 |
| 3,162,350 | 12/1964 | Miller | 229—34 |

JOSEPH R. LECLAIR, *Primary Examiner.*

R. PESHOCK, *Assistant Examiner.*